(12) United States Patent
Trimmer

(10) Patent No.: US 9,069,988 B2
(45) Date of Patent: Jun. 30, 2015

(54) DETECTING KEY CORRUPTION

(75) Inventor: Mark Trimmer, Bristol (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 89 days.

(21) Appl. No.: 13/325,139

(22) Filed: Dec. 14, 2011

(65) Prior Publication Data

US 2012/0148047 A1 Jun. 14, 2012

(30) Foreign Application Priority Data

Dec. 14, 2010 (GB) .................................. 1021141.5

(51) Int. Cl.
| | |
|---|---|
| H04L 9/06 | (2006.01) |
| G06F 21/64 | (2013.01) |
| G06F 21/72 | (2013.01) |
| G06F 21/79 | (2013.01) |
| G06F 11/10 | (2006.01) |
| G06F 12/16 | (2006.01) |

(52) U.S. Cl.
CPC ............... *G06F 21/64* (2013.01); *G06F 11/10* (2013.01); *G06F 12/16* (2013.01); *H04L 9/06* (2013.01); *G06F 21/72* (2013.01); *G06F 21/79* (2013.01)

(58) Field of Classification Search
CPC ............ H04L 9/06; G06F 11/10; G06F 12/16
USPC ............................................. 380/277, 264, 46
See application file for complete search history.

(56) References Cited

U.S. PATENT DOCUMENTS

| | | | |
|---|---|---|---|
| 2004/0001595 A1 | 1/2004 | Hopkins et al. | |
| 2006/0133607 A1* | 6/2006 | Forehand et al. | 380/44 |
| 2007/0245109 A1* | 10/2007 | Murillo et al. | 711/163 |
| 2008/0025506 A1* | 1/2008 | Muraoka | 380/46 |
| 2009/0204824 A1* | 8/2009 | Lin et al. | 713/193 |
| 2010/0241874 A1* | 9/2010 | Vergnes et al. | 713/193 |
| 2010/0306635 A1* | 12/2010 | Tang et al. | 714/807 |

FOREIGN PATENT DOCUMENTS

JP 2003051817 A 2/2003

OTHER PUBLICATIONS

UK Search Report for GB1021141.5 mailed Mar. 24, 2011 (3 pages).

* cited by examiner

*Primary Examiner* — Jeffrey Pwu
*Assistant Examiner* — Samuel Ambaye
(74) *Attorney, Agent, or Firm* — Gardere Wynne Sewell LLP

(57) ABSTRACT

Corruption in a key stored in a memory is detected by reading a key from a key memory and determining if detection bits of the key read from the key memory correspond to an expected value. The expected value is a value of the detection bits of the key when the key is written to the key memory.

19 Claims, 4 Drawing Sheets

DETECTING KEY CORRUPTION

PRIORITY CLAIM

This application claims priority from United Kingdom Application for Patent No. 1021141.5 filed Dec. 14, 2010, the disclosure of which is hereby incorporated by reference.

TECHNICAL FIELD

The present invention relates to a method and application and in particular but not exclusively to the detection of corruption within keys used for encryption of communication between entities for example the detection of corruption within keys stored in an integrated circuit.

BACKGROUND

Encoding using keys is a widely accepted method of cryptography. Key algorithms are based on a secret key assigned to each communication device or entity. Each device may use their secret key to encrypt and/or decrypt data sent and received to the device. A key may also be used to identify an entity as well as provide proof of authentication for that entity.

An example of key algorithm is a symmetric key algorithm. In this algorithm a secret key is shared between two communicating devices. The devices exchange data encrypted with the secret key. The data encrypted with the secret key can only be decrypted by a device with knowledge of the secret key and in this manner the encrypted data is as secure as the key itself.

A secret key is generally stored by a device in non-volatile memory such as a fuse bank. Due to the risk of the key being read from the memory by an unauthorized third party, the key itself is scrambled before being stored. In this manner any data read from the non-volatile memory will not result in the key being compromised. A communicating device will descramble data read from its non-volatile memory on power up and recover the secret key.

The key may also be comprised of corrupting the key in the non-volatile memory. For example in a fuse memory, hackers may systematically blow the fuses to a value of one. A scrambled key corrupted as such cannot be descrambled to recover the unscrambled value of the key.

In order to check the integrity of data stored in the non-volatile memory (to determine whether the scrambled key has been corrupted) a hash key algorithm can be used. A hash key algorithm creates a hash of the scrambled key before the scrambled key is stored in the non-volatile memory. The hash itself is then stored with the scrambled key in the memory.

The integrity of the scrambled key stored in the non-volatile memory can then be confirmed by recalculating the hash when the scrambled key is read from the memory and comparing the recalculated hash to the original hash stored in the non-volatile memory.

A hash value should be such that it is not feasible to determine a message from which the hash has been calculated based on the hash value. It should also not be feasible for two different messages to generate the same hash. Therefore the generation of a hash value can be complex and requires additional memory resources.

Calculation of a hash value may require significant hardware and software capabilities of a device. Storage of the hash requires non-volatile storage space in addition to the non-volatile storage space provided for the scrambled key. It is not always possible to provide the hardware, software and additional memory required in order to calculate and store a hash function.

SUMMARY

According to a first aspect, there is provided a method for determining corruption in a key stored in a memory, the method comprising: reading a key from a key memory; and determining if detection bits of the key read from the key memory correspond to an expected value; wherein the expected value is a value of the detection bits of the key when the key is written to the key memory.

The key read from the key memory may be in a scrambled form and the method may further comprise descrambling the key to recover the detection bits of the key read from the key memory.

The descrambled key may comprise the detection bits and unknown bits.

The method may further comprise at least one of encrypting and decrypting data with the descrambled key.

The key memory may be a fuse bank.

The expected value may be a predetermined bit pattern.

The detection bits may correspond to the predetermined bit pattern when the key is written to the key memory, wherein the key may comprise the detection bits and may be scrambled before being written to the memory.

Determining if the detection bits of the key read from the key memory correspond to the expected value may be carried out by checking hardware.

The method may further comprise: determining if the key is corrupted by checking that the detection bits of the key read from the key memory correspond to the expected value.

The key may comprise 128 bits and the detection bits may comprise 8 bits.

According to a second aspect, there is provided an apparatus for determining corruption in a key stored in a memory, the apparatus comprising: a processor configured to read a key from the key memory; checking hardware configured to determine if detection bits of the key read from the key memory correspond to an expected value; wherein the expected value is a value of the detection bits when written to the key memory.

The apparatus may be an integrated circuit.

According to a third aspect, there is provided a computer program for determining corruption in a key stored in a memory, said computer program configured to: read a key from a key memory; and determine if detection bits of the key read from the key memory correspond to an expected value; wherein the expected value is a value of the detection bits when written to the key memory.

According to a fourth aspect, there is provided a method for determining corruption in a key stored in a memory, the method comprising: reading a scrambled key from a key memory; descrambling the scrambled key to recover detection bits of the descrambled key; determining if the recovered detection bits of the descrambled key correspond to an expected value; wherein the expected value is a value of detection bits of a key that is scrambled and written to the key memory as the scrambled key.

Some embodiments may provide a method of maintaining the integrity of data such as a private key without the complexity of hardware and software required by a hash function.

BRIEF DESCRIPTION OF THE DRAWINGS

Some embodiments will now be described by way of example only with reference to the accompanying Drawings in which.

DETAILED DESCRIPTION OF THE DRAWINGS

In order for a key to be valid in the encryption and decryption of data, the key remains a secret. As a result, access to the key during the manufacturing and testing process of a device or entity must be minimized. In some manufacturing processes, the key is stored on the device, for example an integrated circuit, by a proprietor of that device or other person who is trusted with the knowledge of the key. In this way the manufacturer or tester of the device remains unaware of the key and the key remains secret. The manufacturer and/or tester however still needs to be able to test that the key was written to the device correctly and does not comprise errors.

Figure 1:
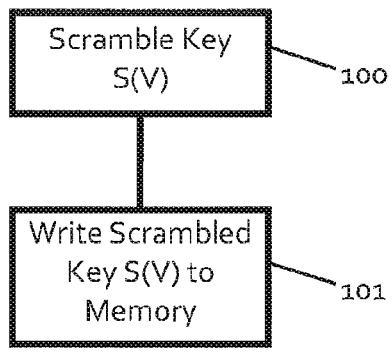
FIG. 1 shows a flow diagram showing the steps of writing the key to a memory.

FIG. 1 shows a method that may be carried out by a proprietor in order to write a secret key chosen by the proprietor to a memory associated with a device. This key may be calculated by the proprietor using an algorithm or may be assigned randomly. The key may be selected to fulfill various criteria such as length of the key, cryptographic strength of the key and may be chosen to correspond or compliment a key used by external devices or systems that may wish to communicate with the device.

A typical key is 128 bits. Generally the length of the key is proportional to the strength of the key however the key length may be chosen according to memory size limitations of a device. The key length may also be chosen to comprise a number of bytes. For example an application may require a key strength corresponding to 100 bits, however due to a bus size, communication of the key may be simplified by choosing a key with 128 bits. The key size may generally be rounded up to the nearest word.

The key may be chosen to correspond to an external device. For example, in symmetric key algorithms an identical key may be known by the external device with which this first device is to communicate. In the case of a set top box, an identical key may be known at a service provider and used to encrypt information such as sound or video signals or program information in order to be sent to the set top box and decrypted. The key is therefore chosen to be suitable for the functionality of the device.

Before the key is written to a memory of the device, the key is scrambled at step 100 by an encryption algorithm S(V) implemented in hardware, where V is the value of the unencrypted key and S is an encryption algorithm to scramble the key. The key is scrambled before writing to a memory so that the unencrypted key cannot be read directly from the memory. Once the key is scrambled, the scrambled key S(V) is written to the memory at step 101.

The memory is a non-volatile memory, for example a fuse bank. In some embodiments for a 128 bit key, the memory may correspond to 128 fuses set to 0 that may be blown to take on a value of 1. It will be appreciated that the number of fuses will correspond to the length of the key. It will also be appreciated that any suitable memory can be used.

Once the key is stored in the memory in scrambled form, the remaining manufacturing and testing of the device may take place. It will be appreciated that the key need not be written to the device physically at a proprietor, but may be sent to the manufacturer and tester to be written to the device.

Figure 2:
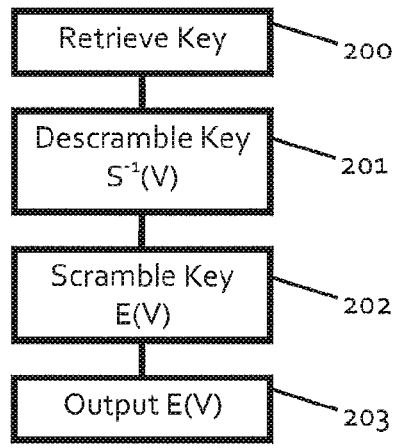
FIG. 2 shows a flow diagram indicating the steps of retrieving the key from memory and determining that the key was written correctly.

As previously mentioned, in order to fully test the device the manufacturer or tester must read the key from the memory to check that the key has been written correctly before the device is put in use. FIG. 2 shows a method used by the tester of the device in order to determine that the key has been written correctly to the memory.

At step 200 in FIG. 2 the value of the key scrambled by the S(V) algorithm is retrieved from the non-volatile memory of the device.

At step 201 the device descrambles the key using descrambling algorithm. The descrambling algorithm corresponds to the scrambling algorithm S(V) implemented on the device. The descrambling algorithm $S^{-1}(V)$ acts as the inverse of S(V) and is able to retrieve the original unencrypted key from the scrambled key written to the memory.

It will be appreciated that the scrambled key and descrambled key are only signaled internally to the device and will therefore not be visible to an external device or probe. Once the key has been descrambled at step 201, the key is re-scrambled using a second scrambling algorithm E(V), where V is the value of the unencrypted key. The method then proceeds to step 203 where the key scrambled with E(V) is output. The tester can then determine if the output scrambled key E(V) corresponds to a known value of E(V). In this manner the tester does not become aware of the unencrypted value of the key, but may check that the key has been written correctly to the memory.

Although a high level of security is used to write the key to the memory and check that the key has been written correctly, it is feasible that both the S(V) and E(V) algorithms may be leaked or become public knowledge. Although it is very difficult to determine the unencrypted key by reversing the two algorithms, the key may become vulnerable because of characteristics of the memory in which the key is stored. For example, a hacker may be aware of the two scrambling algorithms E(V) and S(V) but be unable to directly read the contents of the fuses and may attempt to determine a value of the key by sequentially blowing each fuse of the memory so that it is known that that fuse holds a value of 1. The hacker may then read the value of the key output scrambled with E(V). Doing this repetitively provides enough information for the key to be determined based on the leaked algorithms and sequential E(V) output.

The above describes an example of a vulnerability of a key in the memory. It will be appreciated that there is potential for a key to be comprised using other methods. However there is a need to detect whether a key in memory has been altered or tampered with in any way.

Embodiments of the present invention propose a key and a method of detecting corruption to the key. Embodiments may detect whether a key has become corrupted while stored in a scrambled form in a non-volatile memory.

Figure 3:
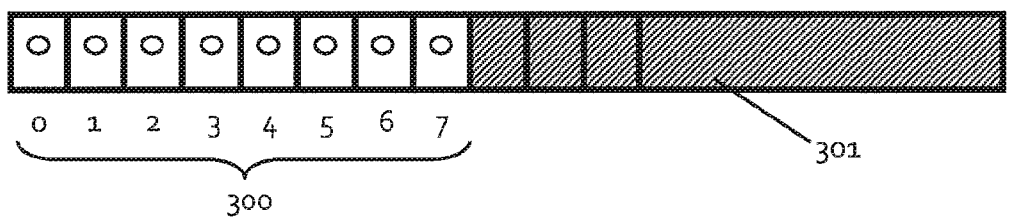
FIG. 3 shows an example of a key.

FIG. 3 shows an example of a key according to an embodiment of the present invention. The key of FIG. 3 is an exemplary 128 bits long however it will be appreciated that the key may be any appropriate length.

In embodiments the key is chosen such that some of the bits of the key are known such that a checking hardware on a device may determine if the known bits read from the key memory are identical to the known bits that were written to the memory. In other words, embodiments may determine if a key has been corrupted using checking hardware corresponding to certain known bits of a key.

For example, in FIG. 3, bits 0 to 7 indicated by 300 are known to have the value of 0. It will be appreciated that the known bits are not restricted to bits 0 to 7 but may be for example bits 120 to 127. The bits may be any bits of the key and need not be continuous bits. For example every 26$^{th}$ bit may be a known bit. Alternatively the position of the known bits may be randomly assigned. In some embodiments the known bits may be distributed within the key in a predetermined manner. Furthermore 7 bits is merely exemplary and the known bits may be any number of bits.

In embodiments, the number of bits chosen is such that the probability that those bits of the descrambled key would be affected if the scrambled key was corrupted is high, however it restricts the number of known bits to be small enough to ensure that the cryptographic strength of the key remains acceptable.

The known bits need also not be set to 0. In embodiments any pattern of values of the known bits may be chosen. The values of the bits need only be known in order that the checking hardware may determine that their value has not been altered since the key was stored in the key memory. The bits that are not known by the checking hardware remain secret from a manufacturer or tester and can be chosen by the proprietor. The known bits are less secure than the remaining bits of the key as the checking hardware must implement a check of their value. The number of known bits used may be chosen such that the strength of the key remains acceptable.

In FIG. 3, bits 0 to 7 are known and bits 8 through 127 may be chosen by the proprietor and may remain secret as discussed above. The proprietor may choose a key with the known bits, for example chose a key with bits 0 to 7 being 0 and the remaining bits being of the proprietor's choice. This key may then be scrambled and written to the key memory using conventional methods.

Although the key of FIG. 3 loses the secrecy of bits 0 to 7, the gains in corruption detection outweigh the slight loss of key strength due to the key being effectively 120 bits long rather than 128. This key according to FIG. 3 is scrambled and written to the memory in scrambled form.

Embodiments of the present invention may be implemented on an integrated circuit in a set top box. The integrated circuit may be used for encrypting and decrypting data sent from the set top box to a service provider. The data may be data such as video, audio or programming information. Embodiments may also be implemented on smart cards or in mobile phones. It will be appreciated that embodiments are applicable to any situation where a stored key is sensitive to corruption.

Figure 4:
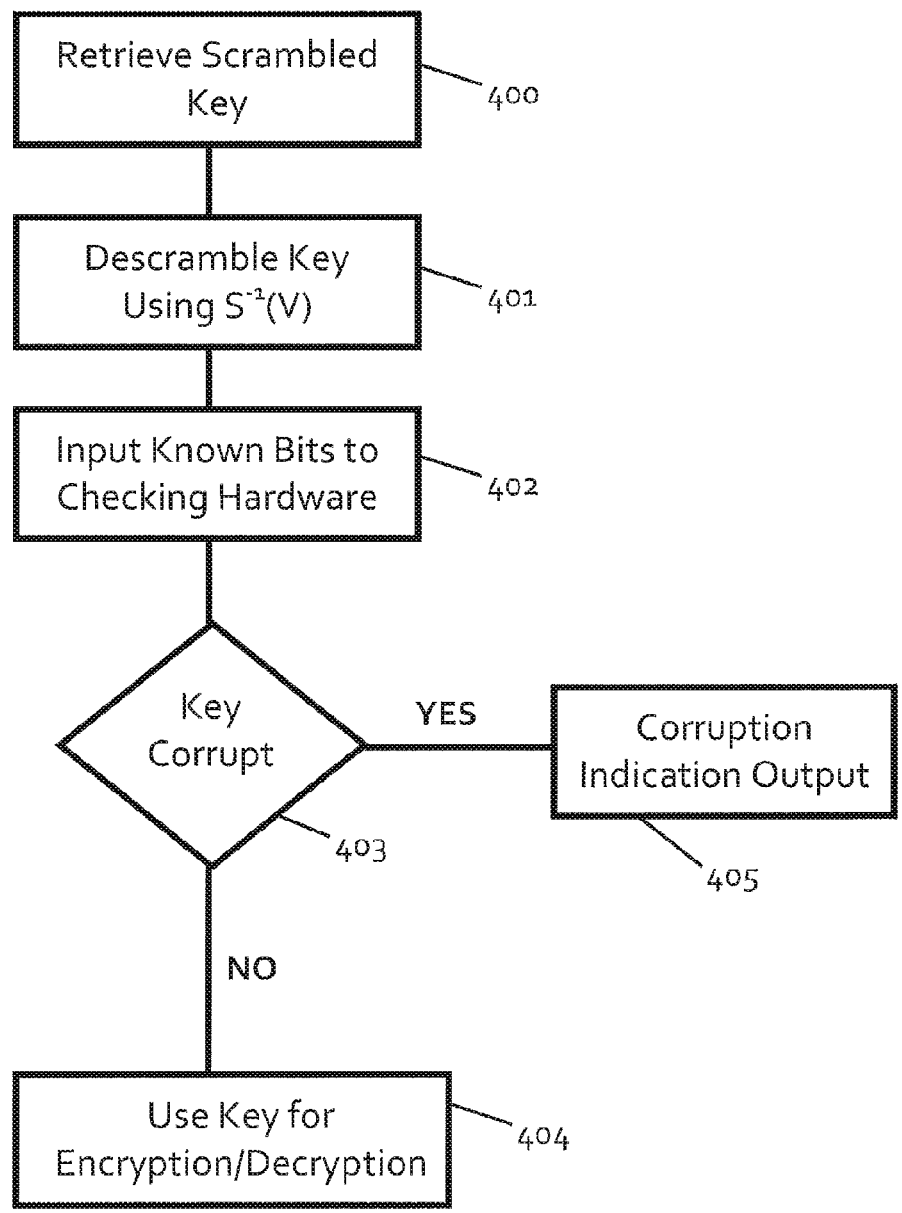
FIG. 4 shows a flow diagram of detecting if a key has been corrupted.

FIG. 4 shows a method of detecting corruption of a key in embodiments for encrypting or decrypting data in an application such as a set top box. In order to decrypt information received at the box or to encrypt information to be transmitted from the box, the key must be retrieved from the key memory. This retrieval is shown at step 400. The retrieved key may be a scrambled key, for example a key scrambled by an algorithm S(V). Once the key is retrieved from the key memory, the key is descrambled at step 401 by an algorithm such as $S^{-1}(V)$ in order to retrieve the descrambled key V.

Once the key V has been determined, the known bits of the key are input to checking hardware in order to determine whether the key has been corrupted. In the example of the key of FIG. 3, bits 0 to 7 are the known bits and are input to the checking hardware. It will be appreciated that this determination may be made with respect to other bits in the key depending on which values have been set to a particular value.

The checking hardware may determine whether any of the known bits have been corrupted. In one embodiment, the checking hardware may be aware of a relationship between the known bits, for example that the bits are all the same value or are alternating values or any other relevant pattern. The checking hardware may also be capable of comparing the known bits in order to determine the relationship between them. The checking hardware may be aware of a result of a comparison between the known bits, if the known bits are uncorrupted. In one example, an OR between two known bits may result in a 0 if the known bits are uncorrupted and a 1 if the known bits have been corrupted. The checking hardware therefore checks if a known relationship between uncorrupted known bits is still present when the known bits are read from the key memory in order to determine whether those bits have been corrupted.

The checking hardware may receive the known bits as inputs and output a value corresponding to a relationship between the input known bits. If the output value corresponds to an expected value which the checking hardware would output if the input known bits were uncorrupted then it is determined that there is no corruption. If the output value is not the same as the expected value, then corruption has been detected.

If the known bits do correspond to their originally stored uncorrupted values the method moves on to step 404 where the key is used in encryption and/or decryption of data.

If the known bits do not correspond to originally stored uncorrupted value then there is an indication that the key itself has become corrupted and the method moves on to step 405 where corruption is detected.

If corruption is detected, the device may react in several ways. For example in the example where the device is an integrated circuit on a set top box, the device may output to a service provider its identity and some kind of indication that the key has been corrupted. As the key has been corrupted and is therefore unsuitable for encryption, a different key may be used for encryption or the indication that the box has been or detected corruption may be sent with the encrypted data. Alternatively the set top box may trigger a shut down in which the box merely turns itself off.

Figure 5:
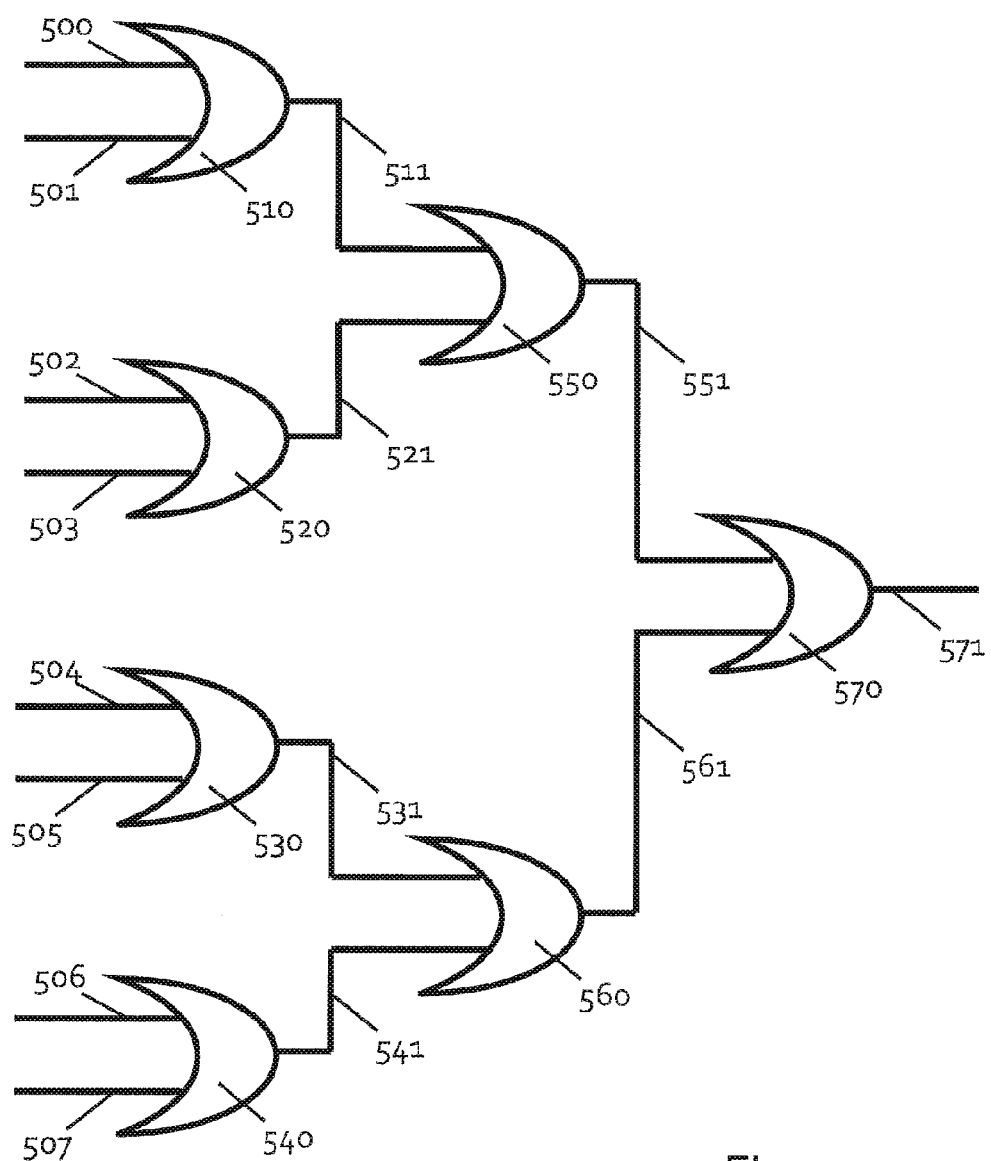
FIG. 5 shows checking hardware in accordance with one embodiment.

The checking hardware is any hardware capable of determining whether the known bits read from the key memory have retained their original values. FIG. 5 shows and example of checking hardware for the example key of FIG. 3.

The checking hardware 500 receives the known bits 0 to 7 (300 in FIG. 3) as input 500 to 507. Although, in this example, the inputs correspond to bits 0 to 7 of the key, as discussed above the inputs may correspond to any number or position of bits as long as the inputs correspond to the bits for which the value is known. The known bits of the key of FIG. 3 are 00000000. Input 500 corresponding to bit 0 and input 501 corresponding to bit 1 are input into OR gate 510. Input 502 corresponding to bit 2 and input 503 corresponding to bit 3 are input into OR gate 520. Input 504 corresponding to bit 4 and input 505 corresponding to bit 5 are input into OR gate 530 and input 506 corresponding to bit 6 and input 507 corresponding to bit 7 are input into OR gate 540.

If the key has not been corrupted, the value of the known bits after descrambling will be 0 and the output 511 of OR gate 510, output 521 of OR gate 520, output 531 of OR gate 530 and output 541 of OR gate 540 will be 0. Output 511 and 521 are input to OR gate 550. Output 531 and 541 are input to OR gate 560. Once again, if the key has not been corrupted, the output 551 of OR gate 550 and output 561 of OR gate 560 will be 0. Output 551 and output 561 are input to OR gate 570. If the key has not been corrupted, the output of OR gate 570 will be 0 and it can be determined that no corruption has taken place.

It will be appreciated that FIG. 5 provides one example of checking hardware that may be used to check the integrity of a key with known bits set to 0. For example if the known bits were set to 1, the checking hardware would be identical to that of FIG. 5 but with AND gates in the place of the OR gates. Other gate configurations may be implemented based on the values of the known bits.

Figure 6:
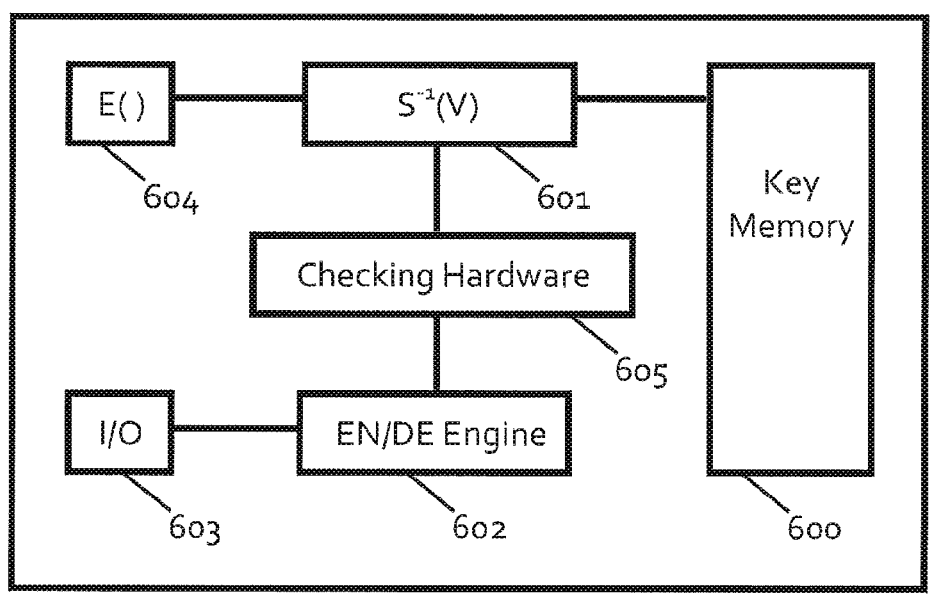
FIG. 6 shows an example of an integrated circuit on which embodiments may be implemented.

FIG. 6 shows an example of typical hardware that may be used to implement embodiments. FIG. 6 shows an integrated circuit comprising circuitry that may be used to implement embodiments. The integrated circuit of FIG. 6 comprises a key memory 600. The key memory 600 may be any kind of non-volatile memory, for example a fuse bank. Key memory 600 may be integrated as part of the integrated circuit, alternatively may be a separate entity to the integrated circuit.

The key memory 600 is shown connected to a scrambler/descrambler engine 601. The scrambler/descrambler engine 601 is capable of descrambling the data saved in the key memory 600 in order to retrieve an unencrypted key. Integrated circuitry further comprises an encryption/decryption algorithm engine 602 which is capable of receiving the unencrypted key and using it to encrypt or decrypt received or data to be transmitted. The encryption/decryption algorithm engine 602 is connected to a receiver/transmitter engine 603 which acts as an input/output port for the integrated circuit controlling data sent to and from the integrated circuit. The integrated circuit further comprises a second scrambler 604 which is used primarily in testing of the device and scrambles the key using an algorithm known by the tester in order to determine whether the key was written without error to the integrated circuit.

The integrated circuit also comprises a checking hardware 605 which may be connected between the scrambler/descrambler engine 601 and the encryption/decryption algorithm engine 602. The checking hardware 605 receives the descrambled key from scrambler/descrambler engine 601 and checks that the key has not been corrupted. The checking hardware may only pass the key onto the encryption/decryption algorithm engine 602 if the key is not corrupt. Alternatively, the checking hardware 605 may output an indication that corruption has been detected.

The number of known bits may be chosen such that the probability of at least one of those bits being affected by corruption in the key memory to the scrambled key is high while still allowing enough bits to remain secret in order to maintain an acceptable cryptographic strength of the key.

Embodiments of the present invention may allow a combination of the scrambling of the key and known bits when written to the key memory and the checking hardware to determine that the known bits have remained unchanged since they were written to the key memory to perform a function providing similar security provision as a hash function. However embodiments do not require the additional hashing logic as required by a hash function. As discussed these embodiments may provide an acceptable loss in cryptographic strength of a key. Embodiments therefore exploit a scrambling algorithm to provide a detection of corruption in any of the scrambled bits of the key by determining whether a few known unscrambled bits have been changed.

In addition embodiments may provide a required key strength while exploiting the allowance of a bus or register size to include corruption detection without requiring further resources. For example, a required key strength of 100 bits may be implemented as a 128 bit key in order to match a bus or register size. Embodiments take advantage of this by providing known bits as part of the key while keeping the key size as required for communication.

The device of the foregoing description may be an integrated circuit or circuitry incorporating an integrated circuit. The device may be appropriate as in the implementation of a set top box or may be applicable to any cryptographic circuitry incorporating keys.

The key may be a symmetric key.

The memory of the foregoing description has been exemplified as a fuse bank however it will be appreciated that other types of non-volatile memory may be used. For example read-only memory, flash memory, hard disks, floppy disks and optical disks may be used.

In the foregoing known bits have been referred to. It will be appreciated that these bits correspond to a preset value that corresponds to a configuration of the checking hardware. These known bits are detection bits used to detect corruption in the key.

In the foregoing the term proprietor has been referred. A proprietor may be a person entitled to chose or be aware of the value of a key. For example a proprietor may be a service provider, owner, commissioner or primary communicator with the device.

The application is being described herein by way of reference to particular non-limiting examples. A person when skilled in the art will understand the general applicability of the application. The scope of protection afforded by the application is to be filed in the appending claims.

What is claimed is:

1. A method for determining corruption of a scrambled key, said scrambled key obtained by scrambling an initial key that includes a first set of data bits having key values and a second set of known bits having fixed values at fixed locations within the key, the known bits including a plurality of known bits each having a fixed value at a fixed location, the method comprising:
   reading the scrambled key from a memory;
   descrambling the scrambled key to recover a descrambled key having a third set of a data bits and a fourth set of detection bits;
   determining if the detection bits at corresponding fixed locations within the fourth set in the descrambled key have data values which match the fixed values of the known bits in the second set; and
   identifying the scrambled key as corrupt if the data value of any detection bit in the fourth set of the descrambled key does not match the fixed value of the known bit in the second set in the initial key.

2. The method of claim 1, wherein the descrambled key comprises the detection bits corresponding to the second set of known bits and key bits corresponding to said first set of known bits.

3. The method of claim 2, further comprising at least one of encrypting and decrypting data with the descrambled key.

4. The method of claim 1, wherein the memory is a fuse bank.

5. The method of claim 1, wherein the fixed values at the fixed locations define a predetermined bit pattern.

6. The method of claim 5, wherein the detection bits at the fixed locations correspond to the predetermined bit pattern before the initial key is scrambled.

7. The method of claim 1, wherein determining if the detection bits within the fourth set correspond to the fixed values of the known bits in the second set comprises logically combining the detection bits to obtain a single bit indicative of corruption.

8. The method of claim 7, wherein the method further comprises: determining if the initial key is corrupted by checking that a value of the single bit corresponds with an expected value.

9. The method of claim 1, wherein the initial key comprises 128 bits and the detection bits comprise 8 bits.

10. An apparatus for determining corruption of a scrambled key stored in a memory, said scrambled key obtained by scrambling an initial key that includes a first set of data bits having key values and a second set of known bits having fixed values at fixed locations within the key, the known bits including a plurality of known bits each having a fixed value at a fixed location, the apparatus comprising:
    a processor configured to read the scrambled key from a memory and descramble the scrambled key to recover a descrambled key having a third set of a data bits and a fourth set of detection bits;
    checking hardware configured to determine if the detection bits at corresponding fixed locations within the fourth set in the descrambled key have data values which match the fixed values of the known bits in the second set and identify the scrambled key as corrupt if the data value of any detection bit in the fourth set of the descrambled key does not match the fixed value of the known bit in the second set in the initial key.

11. The apparatus of claim 10, wherein the apparatus is an integrated circuit.

12. A non-transitory machine readable storage medium having executable instructions stored thereon for determining corruption of a scrambled key, said scrambled key obtained by scrambling an initial key that includes a first set of data bits having key values and a second set of known bits having fixed values at fixed locations within the key, the known bits including a plurality of known bits each having a fixed value at a fixed location, said executable instructions when performed by a processor comprises the steps of:
    reading the scrambled key from a memory;
    descrambling the scrambled key to recover a descrambled key having a third set of a data bits and a fourth set of detection bits;
    determining if the detection bits at corresponding fixed locations within the fourth set in the descrambled key have data values which match the fixed values of the known bits in the second set; and
    identifying the scrambled key as corrupt if the data value of any detection bit in the fourth set of the descrambled key does not match the fixed value of the known bit in the second set in the initial key.

13. A method for determining corruption of a scrambled key, said scrambled key obtained by scrambling an initial key that includes a first set of data bits having key values and a second set of known bits having fixed values at fixed locations within the key, the known bits including a plurality of known bit each having a fixed value at a fixed location, the method comprising:
    reading the scrambled key from a memory;
    descrambling the scrambled key to provide a descrambled key having a third set of a data bits and a fourth set of detection bits and recover the detection bits of the descrambled key at corresponding fixed locations;
    determining corruption if any of the detection bits at corresponding fixed locations within the fourth set in the descrambled key have a value that does not match the fixed value of the known bit in the second set in the initial key.

14. The method of claim 13, wherein the second set of known bits are a predetermined bit pattern known before the initial key is scrambled and written to the memory.

15. The apparatus of claim 10 further comprising an encryption/decryption engine configured to accept an unscrambled key.

16. The apparatus of claim 10, wherein the initial key is a symmetric key.

17. The apparatus of claim 10, wherein the memory is a non-volatile memory.

18. The apparatus of claim 10, wherein the initial key comprises 128 bits.

19. The apparatus of claim 10, wherein the apparatus provides output when the scrambled key has been corrupted.

* * * * *